(No Model.)

M. DOSS.
COTTON PLOW.

No. 604,309. Patented May 17, 1898.

Witnesses
John F. Denferwiel
V. B. Hillyard.

Inventor
Mikey Doss.

By his Attorneys,
C. A. Snow & Co.

UNITED STATES PATENT OFFICE.

MIKEY DOSS, OF EL DORADO, ARKANSAS.

COTTON-PLOW.

SPECIFICATION forming part of Letters Patent No. 604,309, dated May 17, 1898.

Application filed August 31, 1897. Serial No. 650,161. (No model.)

*To all whom it may concern:*

Be it known that I, MIKEY DOSS, a citizen of the United States, residing at El Dorado, in the county of Union and State of Arkansas, have invented a new and useful Cotton-Plow, of which the following is a specification.

This invention relates to plows chiefly designed for cultivating cotton-plants, although it may be used for tilling the soil to promote the growth of grain or plants of any variety.

The improvement relates more particularly to the general construction of the implement and the specific means whereby the advance shovels or earth-treating devices are adjusted laterally and held in the desired position.

For a full understanding of the merits and advantages of the invention reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1:
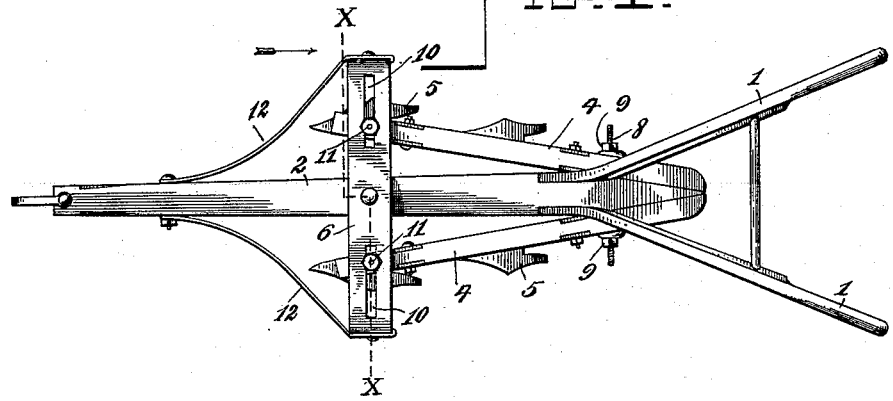
Figure 2:
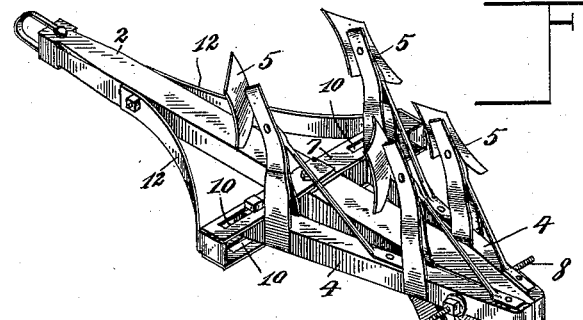
Figure 3:
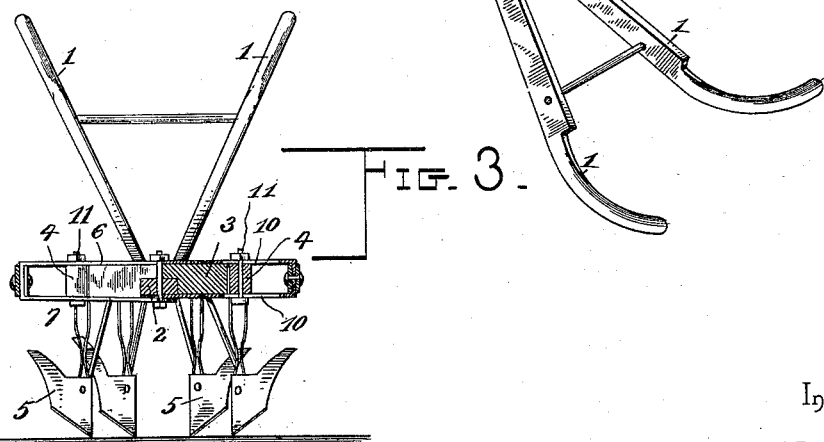

Figure 1 is a top plan view of a plow especially designed for attaining the objects of this invention. Fig. 2 is a perspective view of the implement inverted. Fig. 3 is a transverse section on the line X X of Fig. 1, looking in the direction of the arrow.

Corresponding and like parts are referred to in the following description and indicated in the several views of the drawings by the same reference characters.

The handles 1 are secured at their lower ends to the beam 2 in the usual manner, and the said beam is provided about midway of its ends with a short cross-bar 3, which limits the inward movement of forwardly-divergent side bars 4, bearing shovels or earth-treating devices 5, and to which are secured longitudinally-slotted plates 6 and 7. The beam 2 has its rear portion tapering, and the forwardly-divergent side bars 4 have their rear ends placed against the beveled sides of the beam 2, forming the tapering end, and are secured at their rear ends by means of a transverse rod 8, passing through transversely-alining openings in the beams 2 and 4 and receiving nuts 9 on its threaded ends. The openings in the side bars or beams 4 are sufficiently large to admit of the front ends of the parts 4 being moved outwardly or brought together to vary the distance apart of the shovels or earth-treating devices 5, according to the required distance between the furrows.

The plates 6 and 7 are secured in any substantial manner to either the beam 2 or cross-bar 3 and are connected at their outer ends and have longitudinal slots 10 in vertical alinement to receive the bolts or fastenings 11, by means of which the forwardly-divergent side bars 4 are secured in the required position. The front ends of the side bars 4 pass through the spaces formed between the plates 6 and 7 and are limited in their inward movement by the cross-bar 3 and in their outward movement by the parts connecting the outer ends of the plates. In the preferable construction the plates 6 and 7 and their connecting parts are formed of a single strip or bar of metal bent in the required form, as most clearly indicated in Fig. 3, and having the end portions overlapping and secured by the same means employed for holding the plates to the beam 2. Braces 12, secured at their front ends to the sides of the beam 2, have their rear ends bent around the parts connecting the extremities of the plates 6 and 7 and secured thereto in any desired manner.

The forwardly-divergent side bars 4 are provided with front and rear shovels and earth-treating devices 5, the forward shovels preparing and clearing the land in advance of the rear shovels and adapted to be separated or brought closer together by moving the front ends of the bars 4 laterally in the manner set forth after loosening the bolts or fastenings 11. After the side bars 4 have been properly adjusted they are secured by retightening the fastenings 11, as will be readily understood. The standards bearing the shovels may be of any desired formation and are braced in the usual manner, and the form of the shovels or earth-treating devices may be varied according to the nature and character of the work and the condition of soil.

Having thus described the invention, what is claimed as new is—

1. In combination, a beam, a cross-piece secured to the beam intermediate of its ends and having its outer end portions longitudinally slotted, forwardly-divergent side bars bearing earth-treating devices, means for securing the rear ends of the side bars against opposite sides of the beam, and means for adjustably connecting the front ends of said side bars with the cross-piece and operating in the slots thereof, substantially as set forth.

2. In combination, a beam, upper and lower plates secured to the beam at an intermediate point and having their outer end portions longitudinally slotted and connected, forwardly-convergent braces connecting the outer extremities of the plates with the front portion of the beam, forwardly-divergent side bars bearing earth-treating devices, and means for connecting the rear ends of the side bars with the beam and their front ends with the slotted ends of the plates, substantially as set forth.

3. The herein-described plow, comprising a beam having its rear end tapering, a cross-bar secured to the beam about midway of its length, upper and lower plates secured to the cross-bar and connected at their outer ends, and provided with longitudinal slots, braces connecting the outer ends of the plates with the front portion of the beam, forwardly-divergent side bars bearing shovels or earth-treating devices, means for connecting the rear ends of the side bars with the tapering end of the beam, and fastenings operating in the longitudinal slots of the upper and lower plates and adjustably connecting the front ends of the side bars therewith, substantially in the manner and for the purpose specified.

In testimony that I claim the foregoing as my own I have hereto affixed my signature in the presence of two witnesses.

MIKEY DOSS.

Witnesses:
A. O. PETERS,
H. C. JOHNSON.